(12) United States Patent
Pederson

(10) Patent No.: US 7,690,481 B1
(45) Date of Patent: Apr. 6, 2010

(54) TREE STAND SUPPORT BRACKET

(76) Inventor: Scott M. Pederson, 1718 W. Church Rd., Star Prairie, WI (US) 54026

( * ) Notice: Subject to any disclaimer, the term of this patent is extended or adjusted under 35 U.S.C. 154(b) by 332 days.

(21) Appl. No.: 11/867,870

(22) Filed: Oct. 5, 2007

Related U.S. Application Data

(63) Continuation-in-part of application No. 11/072,807, filed on Mar. 4, 2005, now Pat. No. 7,296,658.

(51) Int. Cl.
A63B 27/00 (2006.01)
(52) U.S. Cl. .................... 182/133; 24/71.1; 24/71 ST; 248/218.4; 248/230.8
(58) Field of Classification Search ................ 182/116, 182/187; 24/71 R, 71 T, 71 ST, 71.1, 68 E, 24/68 T; 248/218.4, 230.8
See application file for complete search history.

(56) References Cited

U.S. PATENT DOCUMENTS

| | | | | |
|---|---|---|---|---|
| 903,593 | A * | 11/1908 | Lowendahl | 211/110 |
| 3,345,028 | A * | 10/1967 | Lawrie | 248/230.8 |
| 4,118,833 | A | 10/1978 | Knox et al. | |
| 4,595,076 | A * | 6/1986 | Gober | 182/136 |
| 4,796,336 | A * | 1/1989 | Scully | 24/68 CD |
| 4,987,653 | A * | 1/1991 | Lin | 24/68 CD |
| 5,199,527 | A * | 4/1993 | Jennings | 182/187 |
| 5,301,911 | A * | 4/1994 | Beauchemin | 248/218.4 |
| 6,588,440 | B2 * | 7/2003 | Varnado | 135/90 |
| 2007/0193001 | A1 * | 8/2007 | Huang | 24/71 ST |
| 2008/0141507 | A1 * | 6/2008 | Huang | 24/71 ST |

* cited by examiner

Primary Examiner—J. Allen Shriver, II
Assistant Examiner—Alaeddin Mohseni
(74) Attorney, Agent, or Firm—C. G. Mersereau; Nikolai & Mersereau, P.A.

(57) ABSTRACT

The belt buckle for a tree stand strap has holes in the frame of the buckle and the handle for accepting pins from a bracket attached to a tree stand such that the tree stand can be hung from the belt buckle that is used to tighten the strap around the tree. In this manner, several straps can be attached to several trees and the tree stand can be quickly and easily attached or detached to the buckles of the tree stand straps and moved from tree to tree. The pins through the buckles, handles and frame of the buckles locks the handle in place on the tree and prevents the belt from coming loose.

12 Claims, 4 Drawing Sheets

TREE STAND SUPPORT BRACKET

This application is a continuation-in-part of Ser. No. 11/072,807 filed Mar. 4, 2005 now U.S. Pat. No. 7,296,658.

BACKGROUND OF THE INVENTION

1. Field of the Invention

This invention relates to tree stands and more particularly to how to quickly and easily attach a tree stand to a tree with a strap and buckle secured to the tree and then inserting pins on a bracket attached to the tree stand into apertures in the buckle.

2. Description of the Related Art

There are many devices for supporting a tree stand in a tree. Many require straps or chains connected directly to the tree stand; however, these devices are difficult to attach to the tree when connected to the tree stand as the tree stand needs to be supported while being attached to the tree. Since tree stands are frequently attached to the tree at an elevated position it is difficult to attach the tree stand to the tree.

There are tree stand supports which have a chain or belt for attaching a bracket or frame to a tree and then attaching the tree stand to the bracket; however, these devices are generally expensive and not easy to carry around such that only one bracket is used with one tree stand. The brackets must also be made in a particular way to engage the tree stand rather than having a universal easy to carry around, inexpensive tree stand support which can be connected to any tree stand, such that a hunter can attach a tree stand support to a number of desired trees and then transport the tree stand between the tree stand supports on different trees for hunting at different locations by quickly and easily detaching the tree stand from one tree stand support and then attaching it to another tree stand support already attached to a tree.

SUMMARY OF THE INVENTION

The tree stand has a standard bracket attached to it for engagement with a buckle on a belt, which adjustably encircles a tree and can be tightened to the desired circumference to hold the belt and buckle securely on a tree. The buckle has apertures for engaging and holding pins on a bracket attached to the tree stand. The apertures are through the handle and frame portion of the buckle which when engaged by the bracket pins will not only hold the tree stand to the tree, but lock the handle of the buckle to the frame so that the belt cannot be loosened while the tree stand is on the buckle.

OBJECTS OF THE INVENTION

It is an object of the invention to quickly and easily attach or remove a tree stand strap and buckle on a tree.

It is an object of the invention to quickly and easily attach a tree stand to a tree.

It is an object of the invention to quickly and easily move tree stands to different pre-selected locations.

It is an object of the invention to make tree stand brackets inexpensively.

It is an object of the invention to make tree stand supports easily transportable and lightweight.

It is an object of the invention to make tree stand brackets, which can be attached to any tree stand.

It is an object of the invention to quickly and easily attach a tree stand bracket to a buckle on a belt around a tree.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
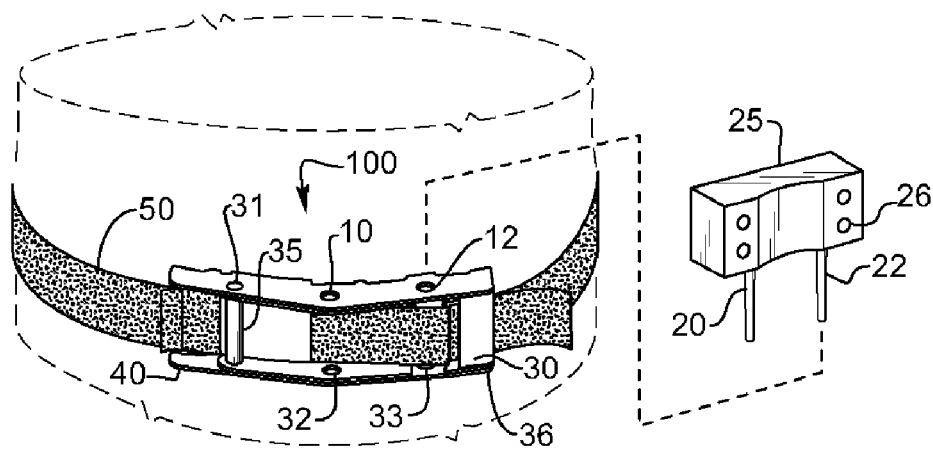
FIG. 1 is a front perspective view of a belt with a buckle having a pivot point of the buckle arm at one end of the buckle around a tree with pin apertures on one side of the pivot point.

The tree stand support belt buckle 100 is used to support a tree stand 200 or 300 on a tree. The tree stand support belt buckle 100 has a belt 50 which encircles a tree and can be tightened so that the tree stand support belt buckle 100 is held firmly in place. The tree stand support belt buckles 100 and associated belts 50 are light weight and inexpensive so a hunter can use more than one tree stand support belt buckle 100 while hunting. The hunter can place several tree stand support belt buckles 100 in different locations such that all he has to do to move the tree stand 200, 300 is remove it from one tree stand support belt buckle 100 by lifting the tree stand 200, 300 from the buckle 100 and move the tree stand 200, 300 to the new location which also has a stand support belt buckle 100 attached to the tree and inserting the pins 20, 22 on bracket 25 on the tree stand into the apertures 10, 12 on the tree stand support belt buckle 100 on the other tree. Tree stand 200, FIG. 2, or tree stand 300, FIG. 3, can thus be moved to various pre-selected locations quickly and easily.

FIG. 1 shows a tree stand support belt buckle 100 with a belt 50 attached to a tree. The tree stand support belt buckle 100 has two apertures 10, 12 for inserting pins 20, 22 on bracket 25 therein to attach a tree stand bracket 25 to the tree stand support belt buckle 100.

Figure 2:
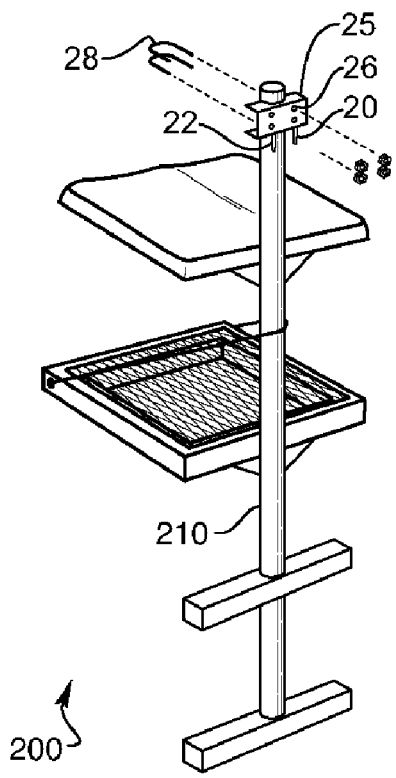
FIG. 2 is a perspective view of the bracket attached to a single pole tree stand.
Figure 3:
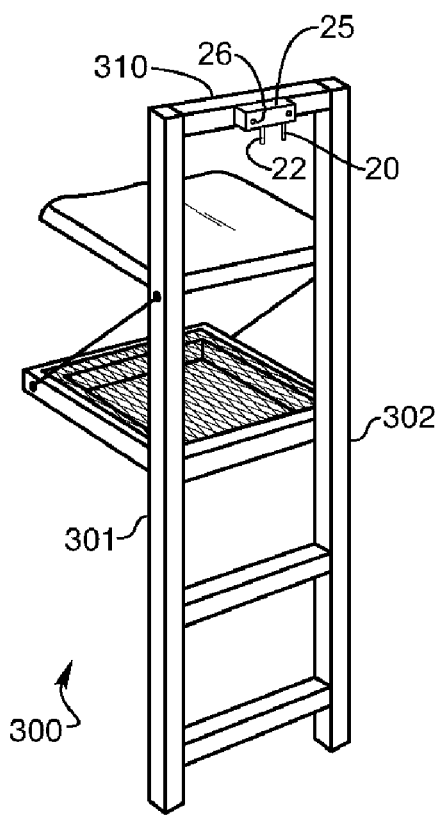
FIG. 3 is a perspective view of the bracket attached to a double pole tree stand.

There are two popular styles of tree stand: the single pole style 200 as shown in FIG. 2 and the double pole style 300 as shown in FIG. 3. The bracket 25 may be of many different designs. Here the bracket 25 is designed to fit on both the single 200 and double pole 300 tree stands. As shown in FIG. 2, the bracket 25 has four bolt holes 26 for attachment of two U bolts 28 through the bracket 25 and around the pole 210 to attach the bracket 25 to the pole. Alternatively, bolts through the pole may be used to attach the bracket 25 to the pole 210. As shown in FIG. 3, tree stand 300 has bracket 25 attached to a cross member 310 between the two poles 301 and 302 by bolts through bolt holes 26. In either case the brackets 25 are attached to the tree stand with a simple to attach method such that any tree stand can be equipped with bracket 25 quickly and easily.

In the embodiments shown, the tree stand support belt buckle 100 adjusts the belt 50 to the desired length and locks the belt 50 in place by the handle 30 being placed in the closed position on the frame 40. There can be many styles of belt buckle 100.

FIG. 1 shows a generic buckle 100 with two apertures 10, 12 on the frame 40 for engaging the pins 20, 22 on bracket 25. The handle 30 is pivotally connected to the frame 40 at hinge 31 which may be held in place by pin 35. The handle 30 has apertures 32, 33 which align with apertures 10, 12 to accept pins 20, 22 of bracket 25 thus locking the handle 30 in place on frame 40. In this embodiment the apertures 10 and 12 are on the same side of pivot point 31. Note the frame 40 may have a curved back portion to better engage the tree.

Figure 4:
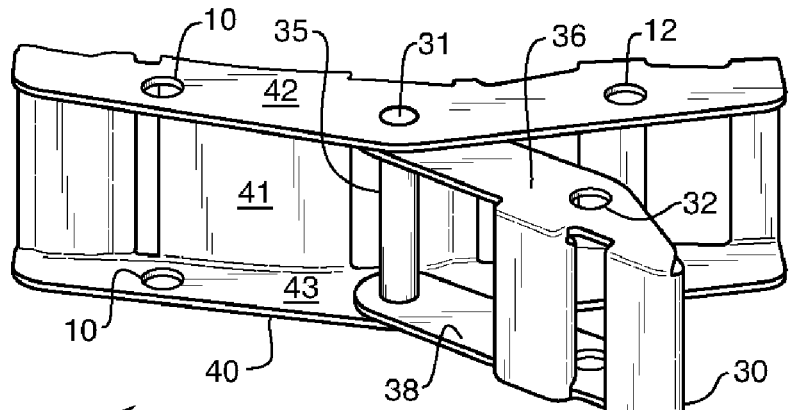
FIG. 4 is a perspective view of a first embodiment belt buckle with the pivot point of the buckle arm in the middle and pin apertures on both sides of the pivot.

Many different styles of buckles may be used. FIG. 4 shows another embodiment of a buckle 100. The buckle 100 as shown has a U-shaped frame 40 with a front panel 41, a first side wall 42, a second side wall 43, and a handle 30 pivotally connected to the frame 40. The handle 30 has a pivot point 31 which may be held in place on the frame 40 by rivets (not shown) or by a pin 35. In this embodiment the apertures for the pins 20 and 22 are the apertures 10, 12 through the walls 42 and 43 of frame 40 to attach the bracket 25 to the buckle 100. The apertures 10, 12 for pins 20, 22 run through the frame 40 at walls 42 and 43 and at aperture 32 through walls 36, 38 of handle 30. The pin 20 locks the handle 30 to the frame 40 so that the belt is held tightly in place while the tree stand is attached to the buckle 100. In this embodiment, the pins 10 and 12 are on opposite sides of the pivot point 31.

Figure 5:
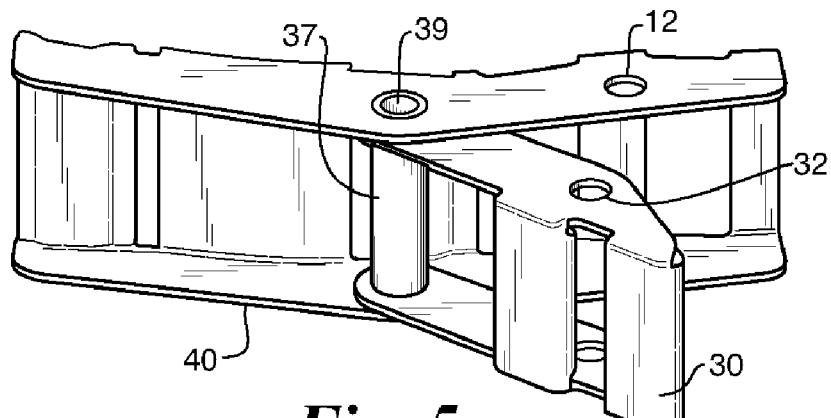
FIG. 5 is a perspective view of a second embodiment belt buckle with the pivot point of the buckle arm in the middle which is also a pin aperture and a second pin aperture on one side of the pivot.

In the embodiment shown in FIG. 5, the frame design is similar to that of FIG. 4; however, the pin 35 is now a tube 37 and pin 20 passes through the lumen 39 of tube 37 instead of aperture 10 in frame 40.

Figure 6:
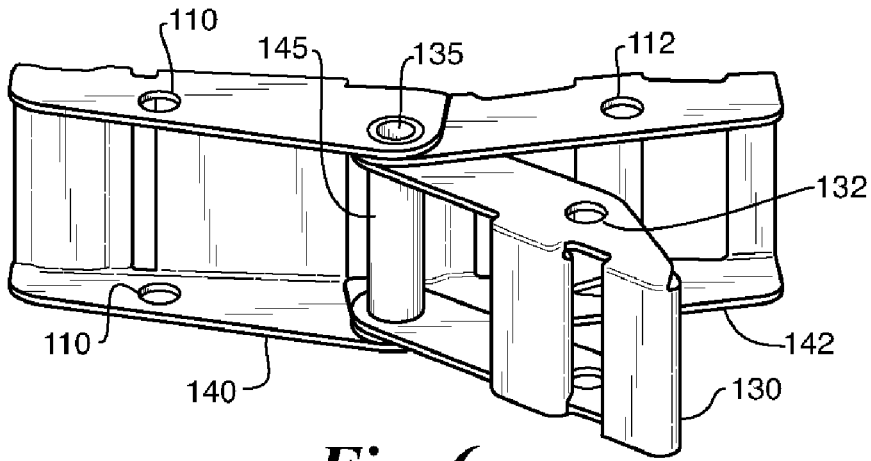
FIG. 6 is a perspective view of a third embodiment having a three piece belt buckle with the pivot point of the buckle arm in the middle and pin apertures on either side of the pivot.

In FIG. 6, the frame has two portions 140 and 142 pivotally connected by a tube 145 with a lumen 135. The handle 30 is also pivotally connected by tube 145 to the handle. Apertures 110 and 112 receive the pins 20, 22 on bracket 25. Aperture 132 in handle 130 aligns with aperture 112 on frame portion 142. Alternatively tube 145 may be replaced by a pin.

In FIG. 1 the pivot point 31 for the handle 30 on frame 40 is at pivot 31 and the apertures 10 and 12 go through the frame and apertures 32, 33 go through the handle the to attach the bracket 25 by pins 20, 22 through the respective apertures in the handle and the frame.

Figure 7:
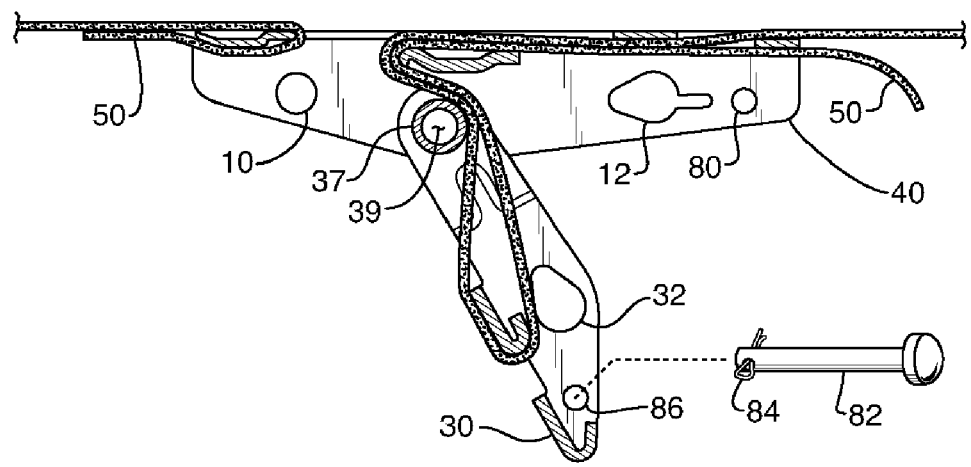
FIG. 7 is an elevation view showing a one piece frame buckle with the handle in the upward position.
Figure 8:
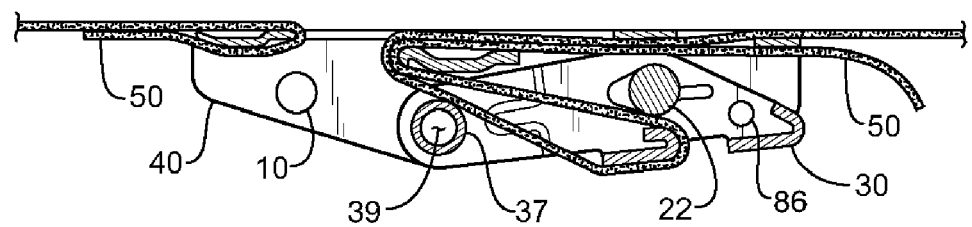
FIG. 8 is an elevation view showing a one piece frame buckle with the handle in the closed position.

The type of buckle 100 used in embodiments of FIGS. 4 and 5 are similar to the buckles and belts of the type as shown in U.S. Pat. No. 4,118,833 which is attached hereto and incorporated herein by reference, to show adjustable length belt buckles with handles and frames which can be used in herein. FIGS. 7 and 8 show a belt 50 and buckle design with frame 40 and handle 30. The frame 40 has apertures 10 and 12 for accepting pins 20, 22. Alternatively one of apertures 10 or 12 cooperates with tube 37 with lumen 39 to accept pins 20, 22 on bracket 25.

As shown in FIGS. 7 and 8 an aperture 80 in frame 40 aligns with aperture 86 in handle 30 to accept locking pin 82 with cotter pin 84 to lock the belt in position when the handle is closed on the frame. In this manner the belt will remain secured to the tree without the pins 20, 22 on bracket 25 through apertures 10, 12, 32 or apertures 39, 12, 32, or apertures 10, 39.

Figure 9:
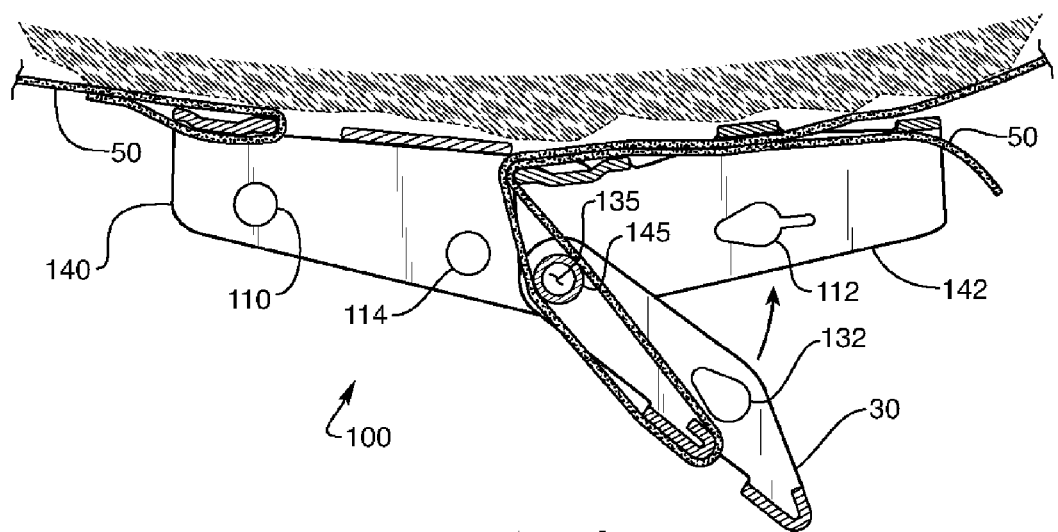
FIG. 9 is an elevation view showing a two piece frame buckle with the handle in the upward position.
Figure 10:
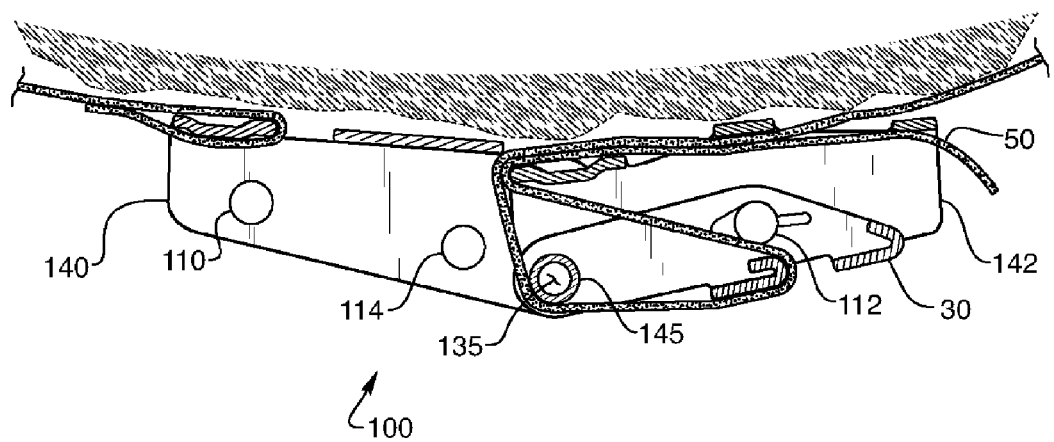
FIG. 10 is an elevation view showing a two piece frame buckle with the handle in the closed position.

In another embodiment a buckle having a two piece frame as in applicant's copending application Ser. No. 11/072,807 filed Mar. 4, 2005 may be used to better attach the buckle 100 around the tree. As shown in FIGS. 9 and 10, the frame has 2 pieces 140 and 142 pivotably connected in the middle by a pin, rivet or tube 145. The pins 20 and 22 on bracket 25 may now fit through apertures 110 and 112 or though tube 145, lumen 135 and either 110 or 112 as can be understood from the above described embodiment for a one piece frame.

Alternatively FIGS. 9 and 10 may have an additional aperture 114 on frame member 140 such that pins 20, 22 on bracket 25 engage apertures 110 and 114 on frame member 140 to hold the tree stand, 200, 300 to the belt buckle 100.

As shown herein, the belt buckle with apertures therethrough can now be used in conjunction with a bracket on a tree stand for attaching a tree stand to a tree, thus simplifying the attachment and eliminating extra parts which have been needed in the prior art.

As shown in FIGS. 9 and 10 the apertures 110, 114 on the outside edge of the frame 140 are far enough from the tree that bark, branches and other impediments on the tree will not interfere with the apertures 110, 114 and the insertion of pins 20, 22 therein.

Obviously, many modifications and variations of the present invention are possible in light of the above teachings. It is therefore to be understood that, within the scope of the appended claims, the invention may be practiced otherwise than as specifically described.

What is claimed is:

1. A tree stand support bracket comprising:
 a bracket having two pins,
 a belt buckle frame having two apertures for accepting the pins on the bracket,
 a belt attached to the belt buckle,
 a handle pivotally attached to the frame, the handle having at least one aperture for alignment with at least one of the apertures on the frame for accepting one of the pins on the bracket and locking the handle in place on the frame.

2. A tree stand support bracket as in claim 1 wherein,
 a tube with a lumen for accepting one pin on the bracket pivotally connects the handle to the frame.

3. A tree stand support bracket as in claim 1 wherein,
 the frame has a first portion, a second portion and the handle all pivotally connected at a pivot point.

4. A tree stand support bracket as in claim 3 wherein,
 a tube with a lumen at the pivot point for accepting one pin on the bracket.

5. A tree stand support bracket as in claim 1 having,
 a tree stand attached to the bracket.

6. A tree stand support bracket as in claim 2 having,
 a tree stand attached to the bracket.

7. A tree stand support bracket as in claim 3 having,
 a tree stand attached to the bracket.

8. A tree stand support bracket as in claim 4 having,
 a tree stand attached to the bracket.

9. A tree stand support comprising:
 a belt buckle including a frame having apertures including apertures for accepting pins of a support bracket, and provision for accepting a belt to be attached to the belt buckle,
 a handle pivotally attached to the belt buckle frame, the handle having at least one aperture for alignment with at least one aperture in the frame for locking the handle in place on the frame.

10. A tree stand support as in claim 9 further comprising a belt attached to the belt buckle.

11. A tree stand support as in claim 9 wherein said handle is pivotally attached to the belt buckle frame at a point other than the location of an aperture for accepting a pin of a support bracket.

12. A tree stand support as in claim 9 wherein said aperture for locking the handle is not used to accept pins of a support bracket.

* * * * *